US006789113B1

United States Patent
Tanaka

(10) Patent No.: US 6,789,113 B1
(45) Date of Patent: Sep. 7, 2004

(54) INFORMATION INPUT/OUTPUT SYSTEM, INFORMATION INPUT/OUTPUT METHOD, RECORDING MEDIUM OF RECORDING INFORMATION TRANSMITTING/ RECEIVING PROGRAM, AND IMAGE FORMING APPARATUS

(75) Inventor: Toshiaki Tanaka, Fukaya (JP)

(73) Assignees: Kabushiki Kaisha Toshiba, Tokyo (JP); Toshiba Tec Kabushik Kaisha, Tokyo (JP)

(*) Notice: Subject to any disclaimer, the term of this patent is extended or adjusted under 35 U.S.C. 154(b) by 862 days.

(21) Appl. No.: 09/618,095

(22) Filed: Jul. 17, 2000

(51) Int. Cl.⁷ .............................................. G06F 15/173
(52) U.S. Cl. ...................... 709/223; 709/200; 709/203; 455/3; 379/100; 707/10
(58) Field of Search ................................ 709/223, 200, 709/203; 455/3; 379/100; 400/76; 358/1.15; 707/10

(56) References Cited

U.S. PATENT DOCUMENTS

| 5,974,401 A |  | 10/1999 | Enomoto et al. .............. 705/40 |
| 6,379,059 B2 | * | 4/2002 | Kaplan ......................... 400/76 |
| 6,728,000 B1 | * | 4/2004 | Lapstun et al. ............ 358/1.15 |
| 2001/0029531 A1 | * | 10/2001 | Ohta ........................... 709/223 |

FOREIGN PATENT DOCUMENTS

| JP | 10-78618 | 3/1998 |
| JP | 10-222527 | 8/1998 |
| WO | WO 0142894 A1 * | 6/2001 ........... G06F/17/30 |

* cited by examiner

Primary Examiner—Hosain Alam
Assistant Examiner—Shabana Qureshi
(74) Attorney, Agent, or Firm—Foley & Lardner LLP

(57) ABSTRACT

An information input/output system capable of selecting an optimum service station is provided in accordance with various service requests.

An information input/output system according to the present invention comprises: a service center for offering various services through a communication network, a plurality of service stations for transmitting/receiving information to/from the service center through the communication network; and a user terminal for transmitting/receiving information to/from the service center or the service station through the communication network. In the present invention, even if the user terminal is not equipped with a printer or a facility for download or upload, various services can be received by arbitrarily selecting the service station 3 having necessary devices or facilities. It is hence possible to rapidly and precisely meet diverse service requests from a user. Additionally, in this embodiment, privacy processing such as encryption is carried out when, for example, printing data with the strict confidentiality. Therefore, the confidentiality cannot be lost.

20 Claims, 12 Drawing Sheets

DATABASE INFORMATION IN SERVICE CENTER

USER INFORMATION OF DEVICE
    (1) MANUFACTURER NAME AND MODEL NAME OF COPIER OR PRINTER
    (2) DISTINCTION BETWEEN MONOCHROME/COLOR
    (3) PRINT SPEED (NUMBER OF PRINT COPIES/MIN)
    (4) TYPE OF PRINTABLE PAPER=AVAILABILITY OF SORT ACCORDING TO PAPER SIZE AND THICKNESS
    (5) AVAILABILITY OF GROUP
    (6) AVAILABILITY OF STAPLE
    (7) PRESENCE/ABSSENCE OF SECURITY FUNCTION
    (8) TYPE OF SECURITY FUNCTION
DOWN & UPLOAD SERVICE INFORMATION
SERVICE UTILIZATION FEE INFORMATION
SERVICE OPERATING SCHEDULE INFORMATION
INFORMATION OF ACCESS POINT CLOSEST TO SERVICE STATION

FIG. 3

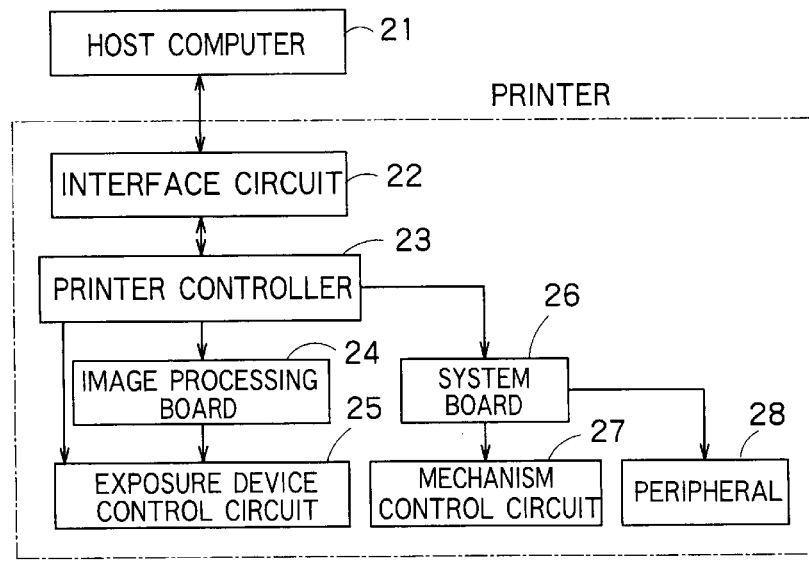

FIG. 4

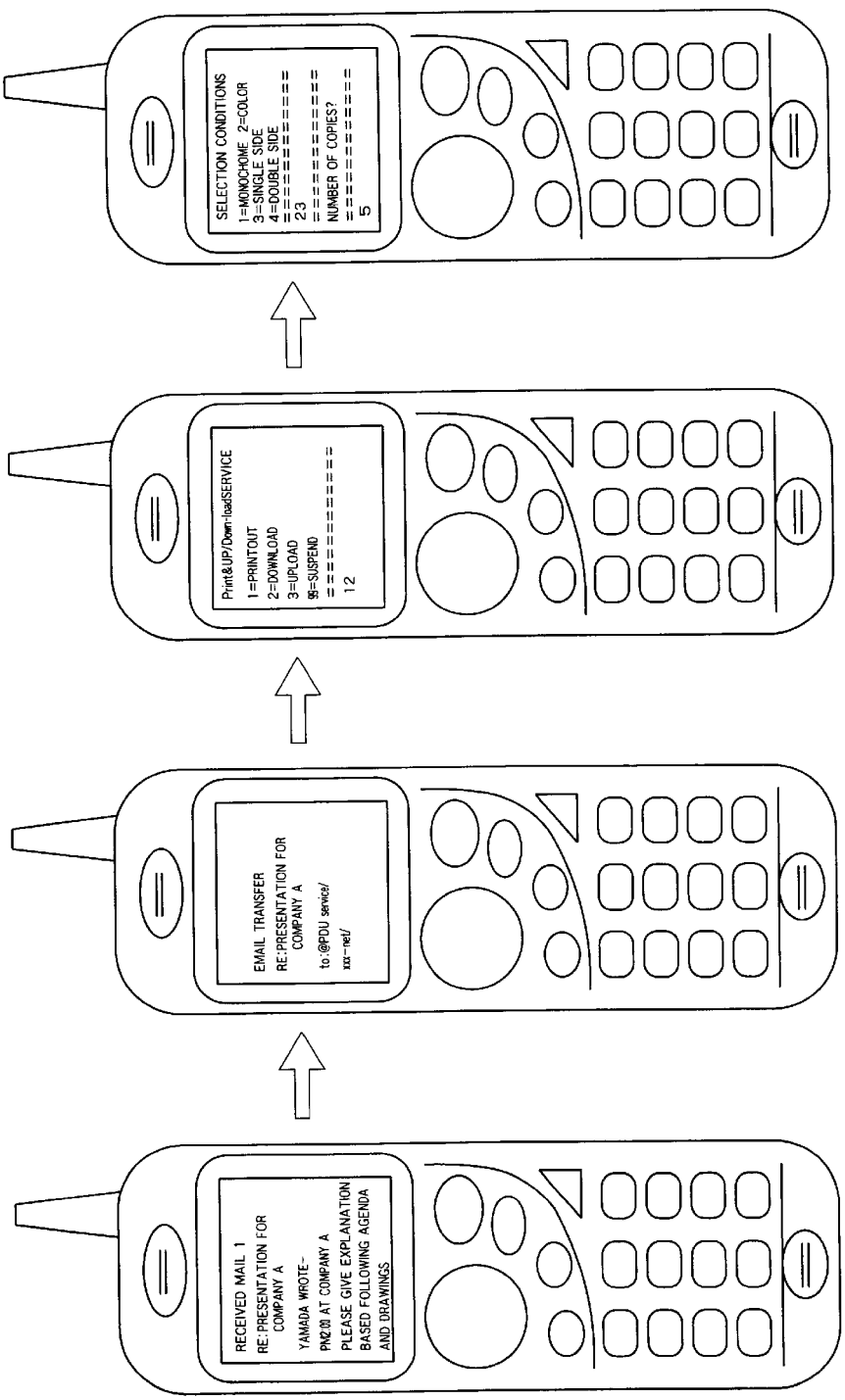

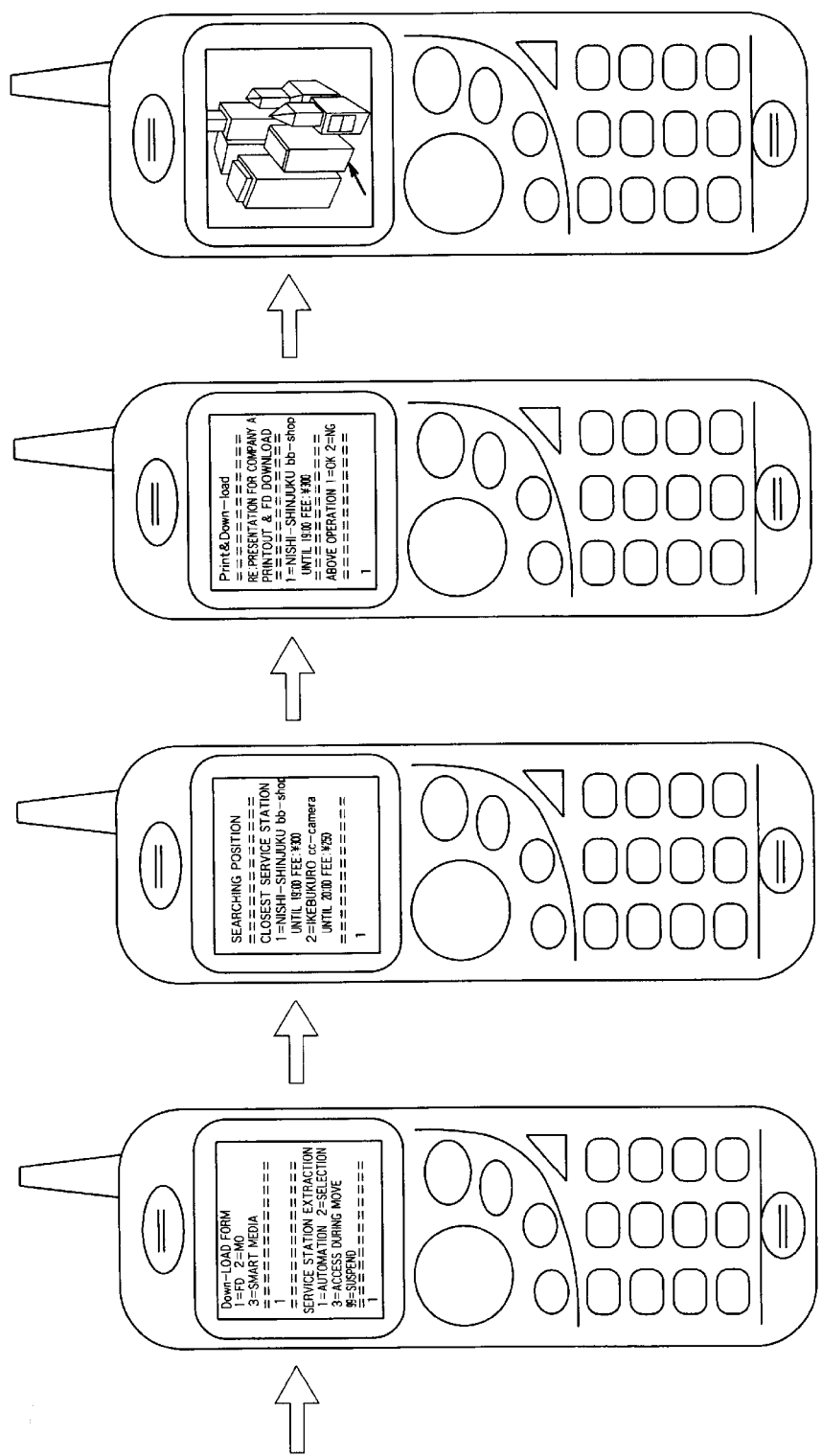

INFORMATION INPUT/OUTPUT SYSTEM, INFORMATION INPUT/OUTPUT METHOD, RECORDING MEDIUM OF RECORDING INFORMATION TRANSMITTING/ RECEIVING PROGRAM, AND IMAGE FORMING APPARATUS

BACKGROUND OF THE INVENTION (i) Field of the Invention

The present invention relates to an information input/output system, an information input/output method, a recording medium recording therein an information transmission/reception program, and an image forming apparatus for receiving various services from a user terminal through a communication network.

(ii) Description of the Related Art

It is now possible to receive various services such as printout or download of data through the internet. However, paper sizes of printed matters (for example, A4 size) or types of mediums (for example, a transparent sheet) are often limited, and detailed print conditions such as a number of print copies and a print speed cannot be arbitrarily designated in the prior art. Therefore, it has not been possible to cope with diverse demands from users, thereby being user-unfriendly.

Further, when trying to perform printing and the like in a service station equipped with, e.g., a dedicated high-performance printer, a user must have searched out such a service station by himself/herself, and specifying a service station has been very time-consuming.

On the other hand, a mobile communication terminal such as a cellular phone and a PHS (Personal Handy Phone) has become widespread in recent days, and information retrieval on the internet and the like or transmission/reception of mails by utilizing a mobile communication terminal has been carried out on a routine base.

Although it is possible to receive various services such as printout or download/upload of data by utilizing the mobile communication terminal, there has been no effective technique for searching out an optimum site for receiving such services.

In addition, in case of printing out a document or an image with the strict confidentiality, when a user instructs execution of printer operation in a remote environment, there has been a possibility that other people may see the printed document without permission, and thus the confidentiality cannot be maintained.

Moreover, when transmitting data to a service station from a mobile communication terminal through a communication network such as the internet, to execute printout or download, a user must have signed up with an internet provider or a mail service provider besides a contract with a service agency of the mobile communication terminal. This has lead to a problem that the cost burden is imposed on the user.

Further, Japanese patent application laid-open No. 78618-1998 proposes a print service system by which a digital image is transmitted through the internet and printed at a location designated by a user if the user does not have a printer. This system only deals with the digital image printout, and printout of documents or download/upload of data is not disclosed. Furthermore, the detailed settings of print conditions such as a number of print copies and a resolution are not taken under consideration.

Additionally, Japanese patent application laid-open No. 27429-1999 discloses a communication control apparatus which transmits to a network a BILL command for downloading the fee information based upon a command to output network utilization fee information and controls printout of the downloaded fee information. This apparatus only covers printout of electronic information and does not deal with download/upload of data.

Moreover, Japanese patent application laid-open No. 222527-1998 discloses a technique that a terminal user transmits retrieval information to a service center and the service center compiles a list of candidate destinations for the retrieval data and transmits it to the terminal user so that the terminal user selects a destination from the list. Since the user must select from the list by himself/herself, there is no guarantee that an appropriate destination can be selected.

In addition, Japanese patent application laid-open No. 161583-1999 discloses an e-mail communication apparatus for reading connection information stored in a mail server access ID card to transmit/receive e-mail information in accordance with this connection information. This apparatus can transmit/receive e-mails to/from a public telephone, but the use of this apparatus in the mobile environment is left out of consideration.

Besides, although a service for transmitting the e-mail received through a mobile phone by FAX or a radio information exchange system complying with the standard of Bluetooth is proposed, the former takes only FAX transmissions into consideration, and the latter can only execute communications in a narrow range.

SUMMARY OF THE INVENTION

It is, therefore, an object of the present invention to provide an information input/output system capable of selecting an optimum service station in accordance with diverse service demands.

To achieve this aim, the present invention provides an information input/output system for transmitting/receiving information through a communication network between at least one user terminal, at least one service station for providing various services, and at least one service center for respectively managing the service station, the service center comprising:

candidate selecting means for selecting candidates for the service station capable of providing a service according to the content of a request from the user terminal;

candidate transmitting means for transmitting the selected candidates for the service station to the user terminal;

request transmitting means for transmitting a request of the user terminal to the service station selected by the user terminal from the candidates for the service station; and positional information transmitting means for transmitting information concerning a position of the service station selected by the user terminal to the user terminal, the user terminal comprising:

service requesting means for requesting a service to the service center;

station selecting means for selecting one of the candidates for the service station transmitted from the service station;

selection result transmitting means for transmitting a type of the selected service station to the service center; and positional information displaying/outputting means for displaying or outputting information concerning a position of the service station transmitted from the service center.

According to the present invention, since an optimum service station can be selected by a simple procedure in accordance with a service request from the user terminal, it is possible to precisely meet diverse service requests of the user.

In addition, since direction information of the way to a finally selected service station is displayed on the user terminal, the user can get to the service station without going astray even if the user has never reached that service station.

BRIEF DESCRIPTION OF THE DRAWINGS

FIG. 3 is a view showing an example of information stored in a database device in the service center 2;

FIG. 4 is a block diagram showing a schematic structure of a printer;

FIGS. 15A to 15D and FIGS. 16A to 16D are views showing an example where print processing is executed by using a mobile communication device as a user terminal.

DESCRIPTION OF THE PREFERRED EMBODIMENTS

An information input/output system according to the present invention will now be described in detail hereinafter with reference to the accompanying drawings.

Figure 1:
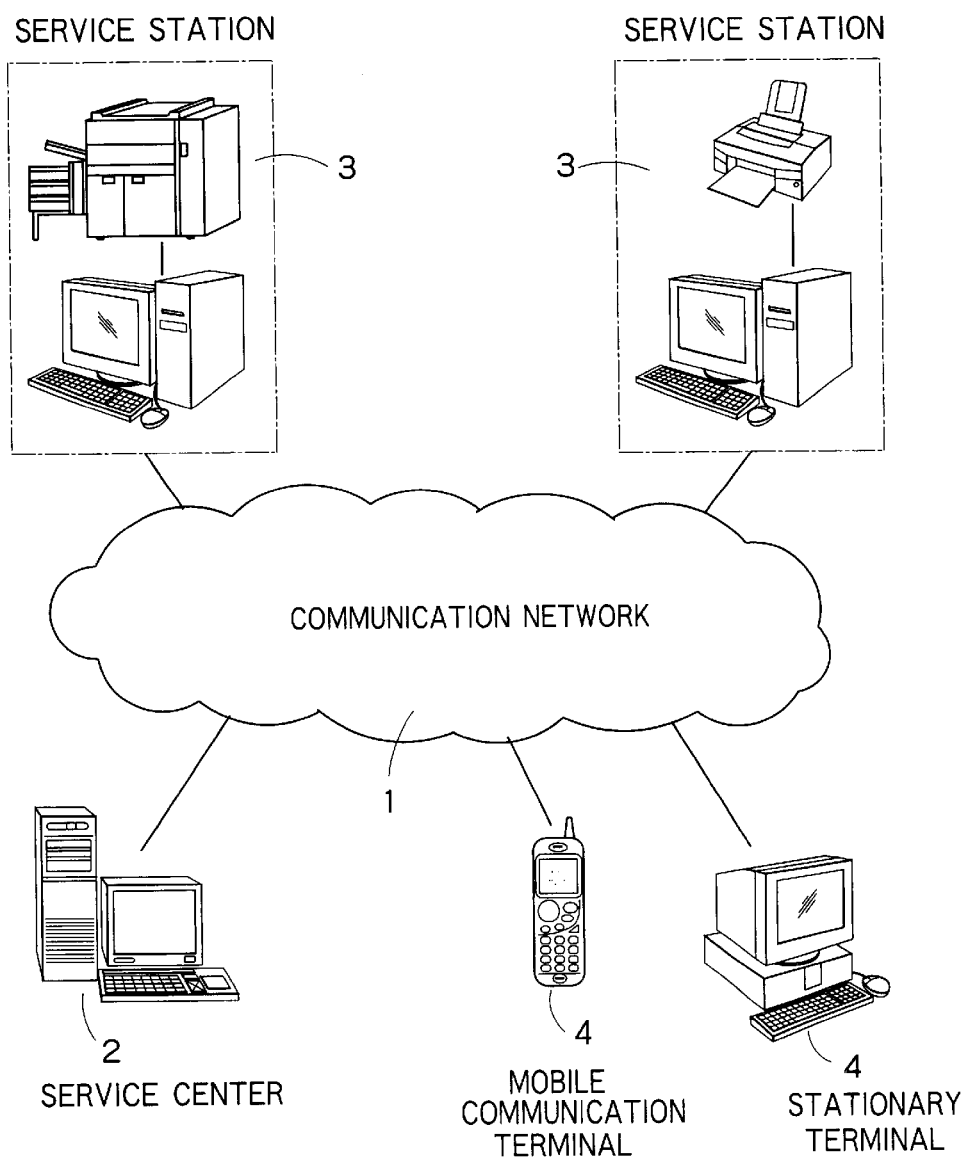
FIG. 1 is a block diagram showing an embodiment of an information input/output system according to the present invention.

FIG. 1 is a block diagram showing an embodiment of an information input/output system according to the present invention. The illustrated information input/output system includes: a service center 2 for providing various services through a communication network 1; a plurality of service stations 3 for transmitting/receiving information to/from the service center 2 through the communication network 1; and a user terminal 4 for transmitting/receiving information to/from the service center 2 or the service stations 3 through the communication network 1.

Figure 2:
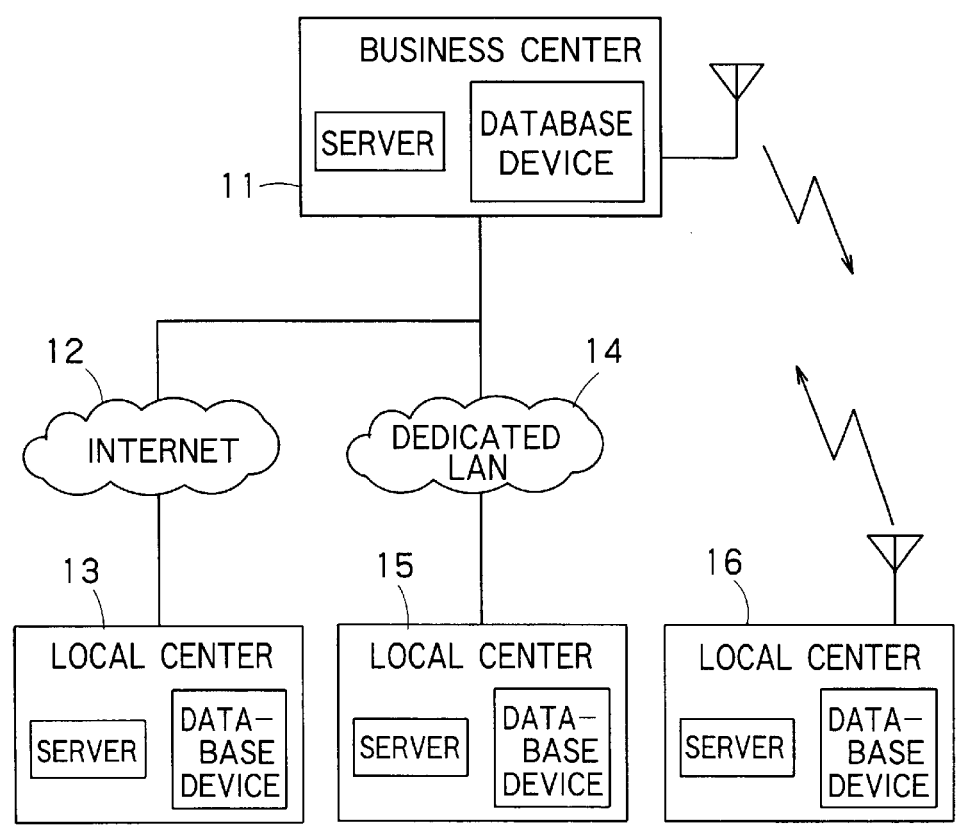
FIG. 2 is a block diagram showing a detailed structure of a service center 2.

FIG. 2 is a block diagram showing the detailed structure of the service center 2. As shown in the drawing, the service center 2 includes: a business center 11; a local center 13 for transmitting/receiving information to/from the business center 11 through the internet 12; a local center 15 for transmitting/receiving information to/from the business center 11 through a dedicated LAN 14; a local center 16 for transmitting/receiving information to/from the business center 11 through a radio line such as satellite communication and the like. A server and a database device are provided in each center illustrated in FIG. 2.

All of three types of local centers 13, 15 and 16 shown in FIG. 2 are not necessary, and only a part of them can be provided. Also, the service centers 2 do not have to be distributed to a plurality of servers and may be gathered up at a one location. Gathering the service centers at one location can simplify the structure of the service centers 2, thereby facilitating management of the database.

The database device in the service center 2 stores therein various kinds of information of, e.g., respective facilities or business conditions of the plural service stations 3. For example, FIG. 3 is a view showing an example of the information stored in the database device in the service center 2.

As shown in FIG. 3, the database device in the service center 2 stores therein specification information of devices provided to the service station 3, download & upload service information, service utilization fee information, service operation schedule information, information of access points nearest to the service station 3, and others.

The above-described specification information can be subdivided into and composed of, for example, (1) a manufacturer name or a model name of a copier or a printer, (2) discrimination between monochrome/color, (3) a print speed (a number of printed sheets per min), (4) a type of printable paper= availability of sorting based on a paper size and a thickness, (5), grouping possibility, (6) stable availability, (7) security function enabled/disabled, and (8) a type of security function.

Since the utility value is increased as an amount of data stored in the database device in the service center 2 becomes large, new information can be additionally stored in the database device through the internet in this embodiment.

The information which can be newly stored in the database device includes the followings, for example.

1. Latest road traffic information or event information stored by a service provider through the internet or a dedicated information net.

2. Latest various kinds of information stored by only a registered user through the internet and the like.

3. Positional information of a user who owns a mobile communication terminal.

4. Various regional information transmitted from each service station.

5. Sales contents or special sale information of an event or a store.

Although the service center usually collects a registration fee from a business proprietor or a user who wants to store information in the database device, it is desirable to take off the registration fee in accordance with an amount of provided information in order to enrich the contents of database and encourage offers of services. As a result, an amount of information stored in the database device can be satisfactory.

As a user terminal 4 shown in FIG. 1, there are two types, i.e., a stationary terminal such as a personal computer (PC) and a mobile communication terminal such as a cellular phone. The stationary terminal is connected to a communication network 1 through a wire line such as a telephone line or an ISDN line, and the mobile communication terminal is connected to the communication network 1 through a wireless line. No specific conformation of the communication network 1 is necessary, and various kinds of network such as the internet and a LAN (Local Area Network) can be applied.

The user terminal 4 requests various services to the service center 2 via the communication network 1. The service center 2 refers to the database device based on the content of the service request from the user terminal 4 or the location of the user terminal 4, and selects at least one candidate for the service station 3 so that the user terminal 4 is informed of the selected candidate for the service station 3 via the communication network 1.

FIG. 4 is a block diagram showing a schematic structure of a printer provided in the service station. The printer illustrated in FIG. 4 includes: an interface portion 22 for transmitting/receiving data to/from a host computer 21; a printer controller 23 for controlling the entire printer; an image processing board 24 for developing print data transmitted from the host computer 21; an exposure device control circuit 25; a system board 26 for controlling a print portion such as a drum; a mechanism control circuit 27 for performing feed control of print paper or staple attachment control and the like; and a peripheral 28 such as a sorter.

Figure 5:
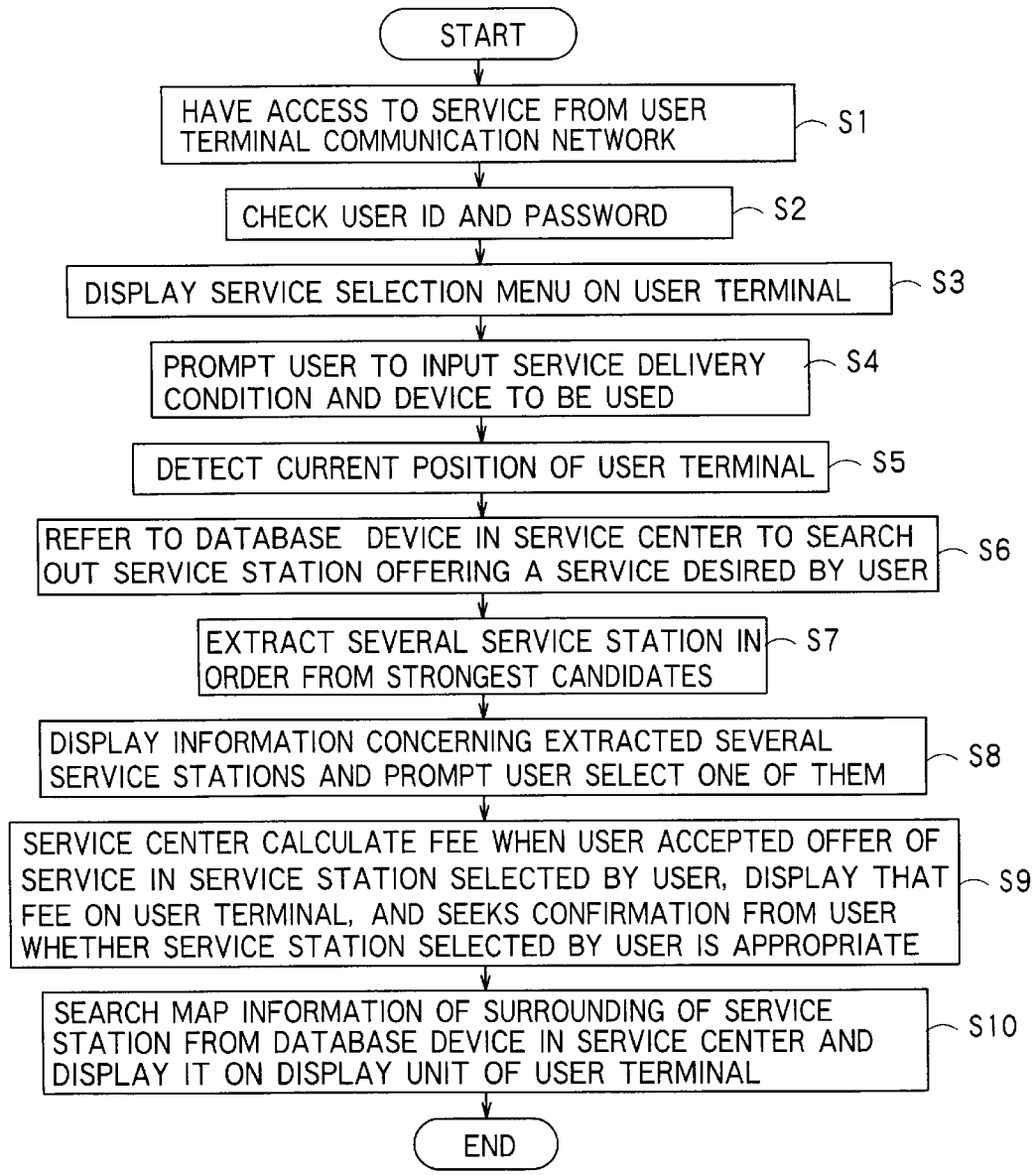
FIG. 5 is a flowchart showing a process procedure of the information input/output system depicted in FIG. 1.

FIG. 5 is a flowchart showing the processing procedure of the information input/output system illustrated in FIG. 1. The processing operation of the information input/output system of this embodiment is described with reference to the flowchart.

A user who wants the offer of services operates the user terminal 4 to have access to the service center 2 through the communication network 1 such as the internet (step S1). Here, if the services center 2 is distributed to a plurality of local centers 13, 15 and 16 as shown in FIG. 2, the closest service center 2 is accessed.

Figure 6:
FIG. 6 is a view showing an example of display of a selection menu.

Subsequently, a user ID and a password are checked up in order that the user cannot utilize services without permission (step S2). A service selection menu such as the one shown in FIG. 6 is then displayed on the user terminal 4 (step S3). Although FIG. 6 shows an example where four services, i.e., a copy service, print, download, and upload are prepared, any other service may be offered.

The user is then prompted to input a service delivery condition and an apparatus specification (step S4). Here, the service delivery condition means a choice, made by the user, of going to the service station, forwarding the service by post, transmission/reception of the service by an email and others. The apparatus specification means a selection of the apparatus provided to the service station 3 or a selection of an operation mode of the apparatus.

The current position of the user terminal 4 is subsequently detected (step S5). For example, when the user terminal 4 is a mobile communication terminal, the current position is detected by transmission/reception between the mobile communication terminal and a base station. Further, when the user terminal 4 is a stationary terminal, the current position is detected based on the user information transmitted by the user terminal 4.

The database device in the service center 2 is then consulted to search out the service station 3 for providing the service wanted by the user (step S6). If a plurality of such service stations 3 are found, some of them are extracted in the order from the strongest candidates (step S7).

Subsequently, information concerning the extracted service stations 3 (locations or features) is displayed on the user terminal 4, and the user is prompted to select any one of these service stations (step S8).

The service center 2 then calculates a fee for the case where the user receives the service at the service station 3 selected by the user, and displays the calculated fee on the user terminal 4. Further, the service center 2 asks for confirmation of whether the service station 3 selected by the user is appropriate (step S9).

If the user's agreement is not obtained, the processing of the step S8 is repeated. If the user's agreement is obtained, map information of a surrounding area of the service station 3 selected by the user is retrieved from the database device in the service center 2 to be displayed on a display unit of the user terminal 4 (step S10).

In the step S10, if the user terminal 4 is a mobile communication terminal, navigation display may be performed in accordance with movement of the user so that the positional relationship between the user and the service station becomes apparent. By carrying out such navigation display, it is possible for the user to reach a desired service station without going astray.

Then, the processing is executed in accordance with a type of service selected by the user.

Figure 7:
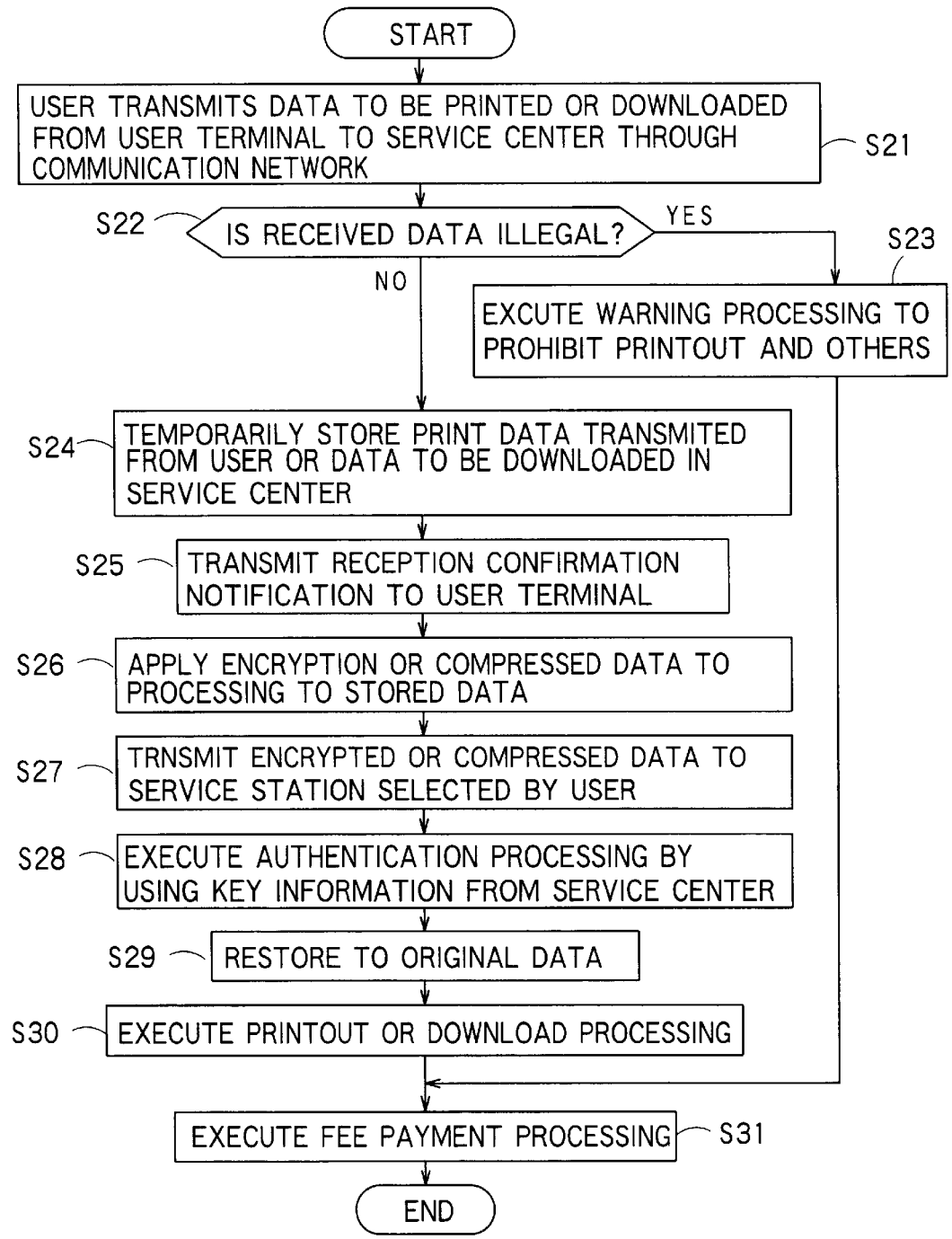
FIG. 7 is a flowchart showing a process procedure of the information input/output apparatus when a user requests a printout or download service.

FIG. 7 is a flowchart showing the processing procedure of the information input/output apparatus when the user requests a printout or download service. At first, the user transmits data (for example, a document or an image) to be printed out or downloaded from the user terminal 4 to the service center 2 via the communication network 1 (step S21). Here, if the amount of data to be transmitted is small, the data can be transmitted by, e.g., an email. On the other hand, if the amount of data is large, it may be transmitted in the form of a packet.

The service center 2 then makes a judgment upon whether the received data is illegal or not (step S22). The "illegal data" means data which is used for forgery or violates the copyright law. The illegality is determined by, for example, checking existence/absence of a watermark or performing pattern matching. Alternatively, a person may visually judge whether it is illegal or not.

When any illegality is detected, a predetermined warning processing (for example, alarm or warning display) is executed, and printout and download services are prohibited (step S23).

On the other hand, when no illegality is detected, printout data or data to be downloaded, which is transmitted from the user, is temporarily stored in the service center 2 (step S24).

Then a reception confirmation notice is transmitted to the user terminal 4 (step S25). Incidentally, instead of printing out or downloading the data directly transmitted from the user, the data to be printed out or downloaded may be received from a location designated by the user (e.g., a server) and temporarily stored in the service center 2.

Then, the stored data is enciphered to avoid abuses, or compression processing is executed so that an amount of data is decreased (step S26). The enciphered or compressed data is transmitted to the service station 3 selected by the user (step S27). At this time, the enciphered data is transmitted together with key information for decoding.

The user then goes to the service station 3 and uses the key information transmitted from the service center 2 to carry out authentication processing (step S28). When authentication succeeds, the service station 3 restores the data transmitted from the service center 2 by uncompressing or decoding (step S29), and then prints out the data in a format meeting the user's demand or downloads it to a recording medium desired by the user (step S30).

Figure 8:
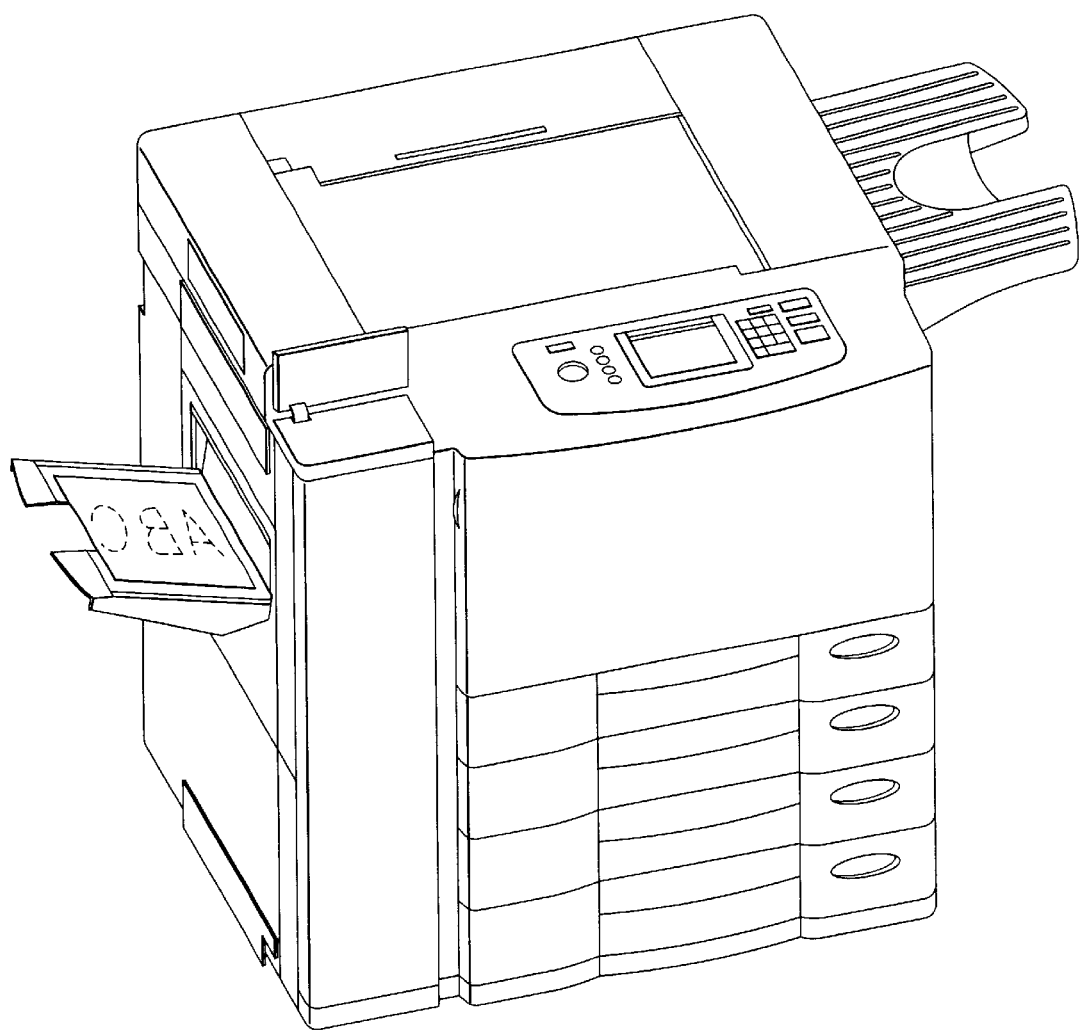
FIG. 8 is a view showing an example of ejecting a paper sheet from a printer with its printed side facing downwards.
Figure 9:
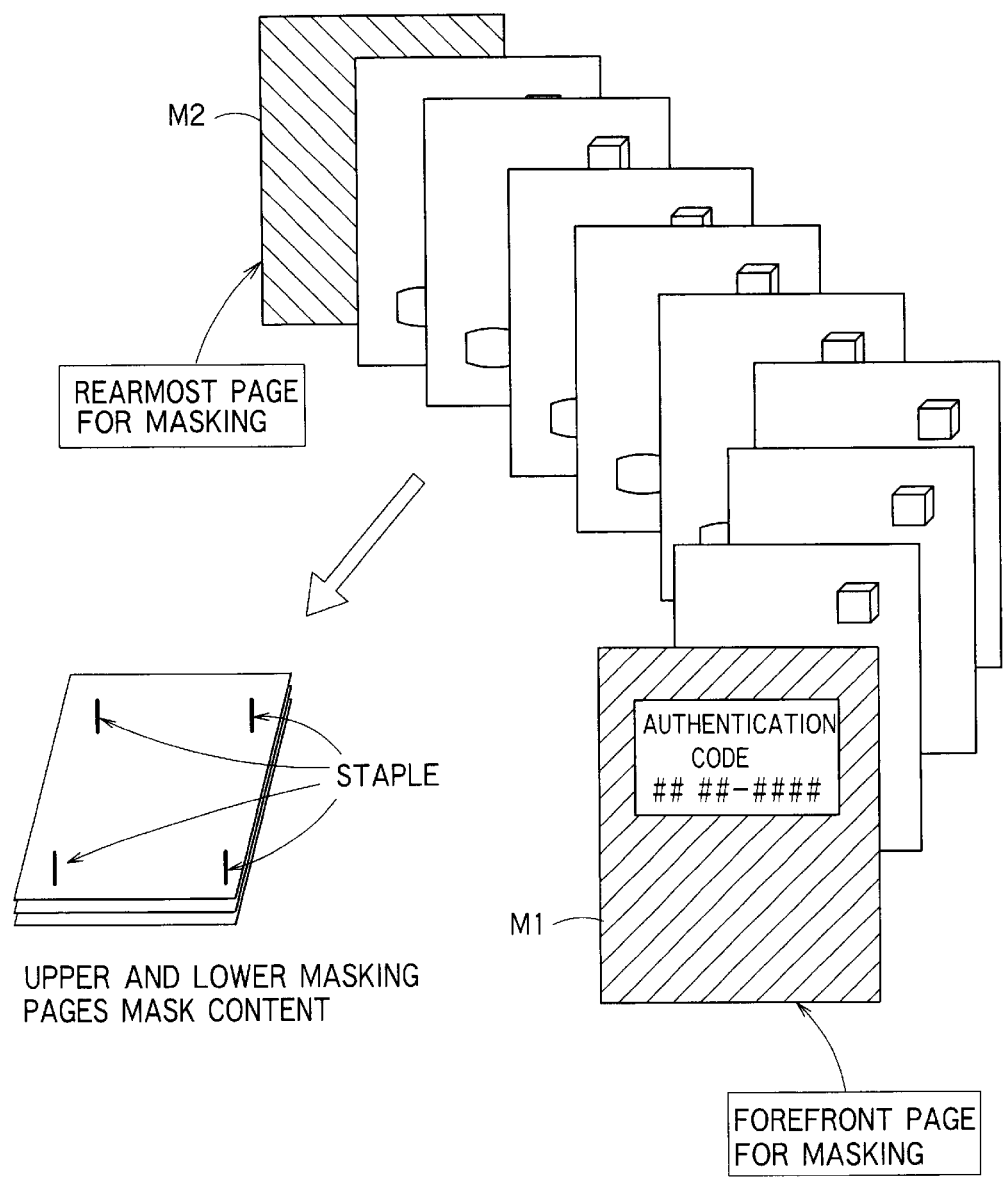
FIG. 9 is a view showing an example where a thick transparent paper sheet for masking is put on a forefront page and a rearmost page of a paper bundle.

Here, when printing out a document or image with a strict confidentiality, the care must be taken so that the printed material seen by others without permission until the user obtains it. Therefore, as an example, it is desirable that a printed sheet is ejected from a printer such as a copier with a printed side facing downwards as shown in FIG. 8, or transparent thick paper sheets M1 and M2 for masking are put on a forefront page and a rearmost page of a printed paper bundle as shown in FIG. 9 and the entire paper bundle is filed by using staples. Here, an authentication code of the user is printed on the forefront page and the printed material is handed to only the user who has the authentication code. Thus, leakage of information can be assuredly avoided.

Figure 10:
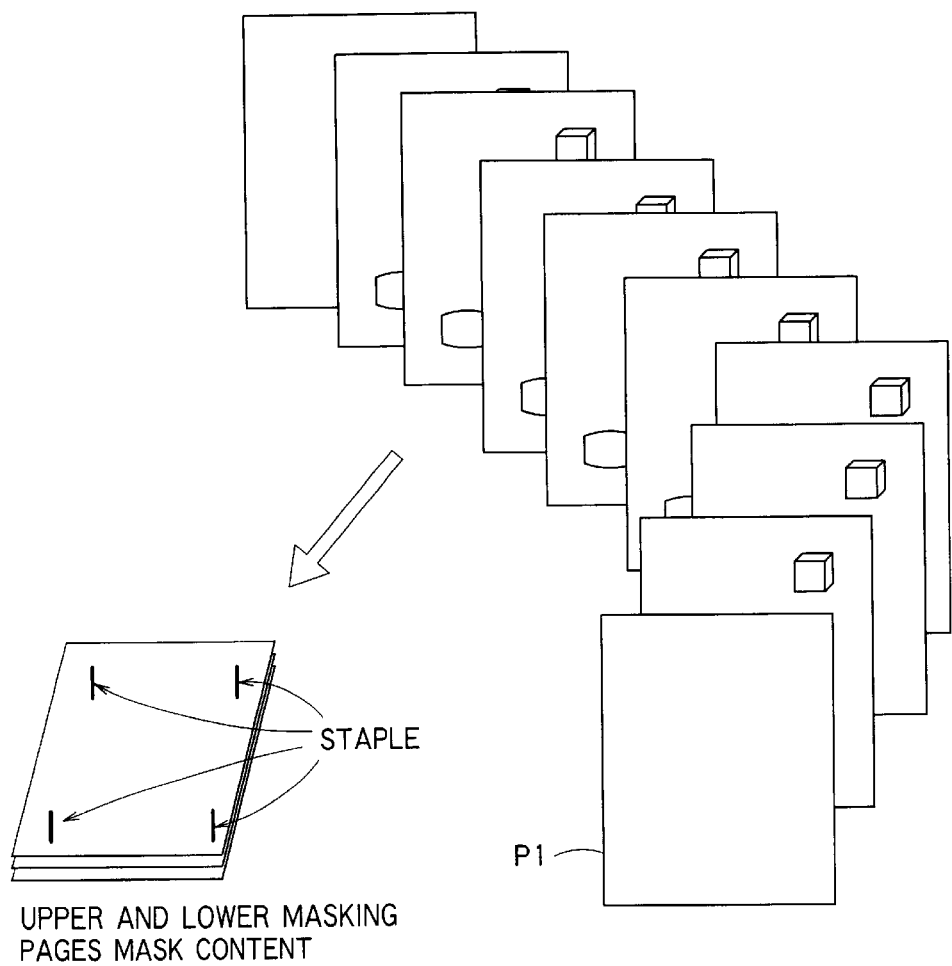
FIG. 10 is a view showing an example where the forefront page is turned over and stacked.

Alternatively, as a technique simpler than that of FIG. 9, the entire paper bundle may be filed by using staples with the printed side of only the forefront page being turned over as shown in FIG. 10.

The printed or downloaded data may be directly handed to the user who goes to the service station 3 or sent to the user by mail and others. If the user directly goes to the service station 3, fee payment processing is carried out on the spot (step S31). Further, in case of forwarding by mail, an invoice may be also forwarded together. As to the fee settlement, settlement processing may be executed by using a credit card and the like on-line when the user requested the service by the user terminal 4.

Figure 11:
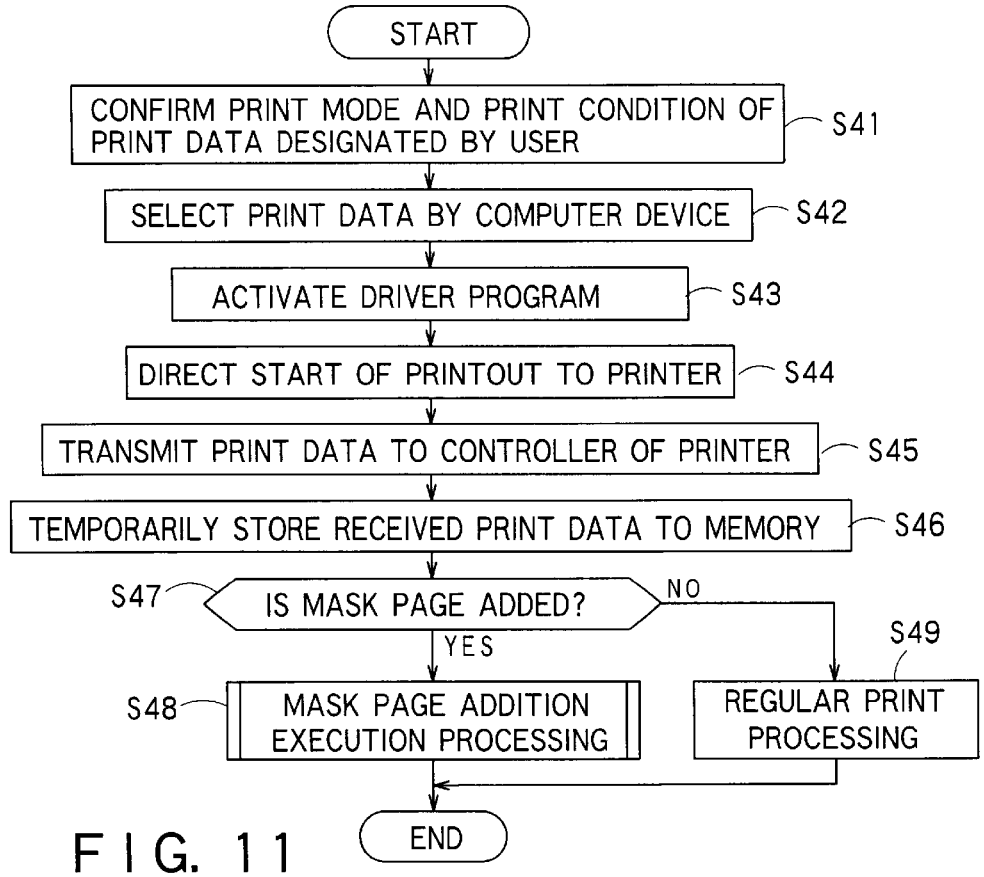
FIG. 11 is a flowchart showing a processing operation of mask page addition processing for adding a paper sheet for masking.

FIG. 11 is a flowchart showing processing operation of a mask page addition processing for adding a paper sheet for masking. This flowchart is executed by the service station 3. At first, a print mode and a print condition of the print data designated by the user are confirmed (step S41). After the print data is selected by using a computer device having the print data (step S42), a driver program for controlling print is activated (step S43).

Subsequently, start of print is directed to the printer shown in FIG. 4 such as a printer or a copier (step S44). The driver program transmits the print data to a controller 23 of the printer (step S45). The controller 23 temporarily stores the received print data in a memory or the like (step S46), and detects control information included in the print data to judge whether the mask page should be added (step S47).

If addition of the mask page is determined, a mask page addition execution processing (step S48), which will be described late, is executed, and if no addition of the mask page is determined, the regular print processing is carried out (step S49).

If a print condition cannot be automatically recognized for some reason in the step S48, the mask page is manually added.

Figure 12:
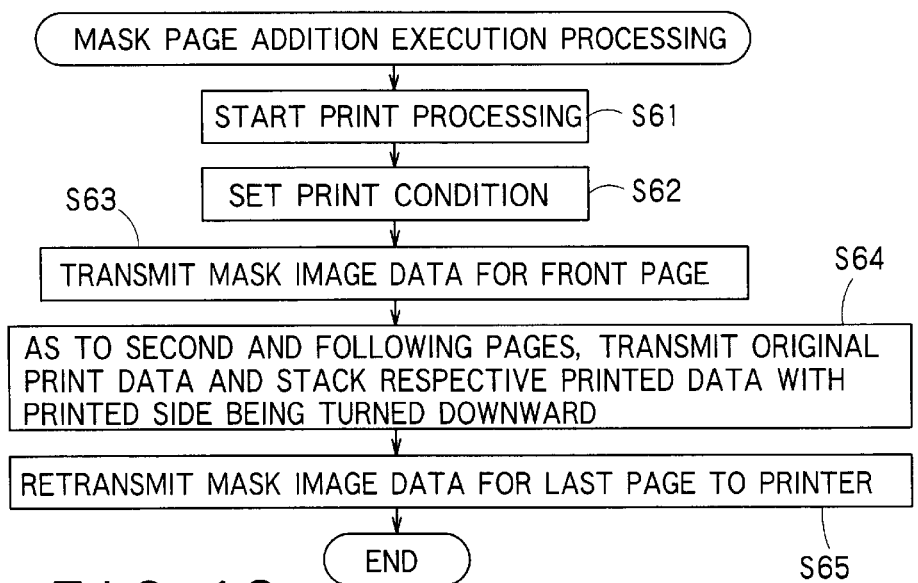
FIG. 12 is a flowchart showing a processing operation of mask page addition execution processing of the step S48 in FIG. 11.

FIG. 12 is a flowchart showing the processing operation of the mask page addition execution processing of the step S48 of FIG. 11. Print processing is first started (step S61). The print condition is then set (step S62). Specifically, the setting is carried out so that a paper size or a direction is designated, the printed side is designated to be turned down and four corners of the paper are filed by staples.

Mask image data for a front page is transmitted to the printer (step S63). As the mask image data, an entirely black or gray paper sheet image is desirable so that the print data on the second and the following pages is not seen through. Further, a paper sheet which is thicker than a usual print paper sheet is desirable. Moreover, an authentication code (registry code) of the user may be printed at a part of the mask image so that the user who designated printout can be specified.

As to the second and the following pages, the original print data is transmitted to the printer with the printed side being turned down, and the respective printed sheets are sequentially stacked (step S64). Upon completion of printing of all the print data, the mask image data for the final page is again transmitted to the printer (step S65). As the mask image data, an entirely black or gray paper sheet image is desirable so that the print data on the previous page is not seen through. Further, a paper sheet which is thicker than a usual print paper sheet is desirable.

Figure 13:
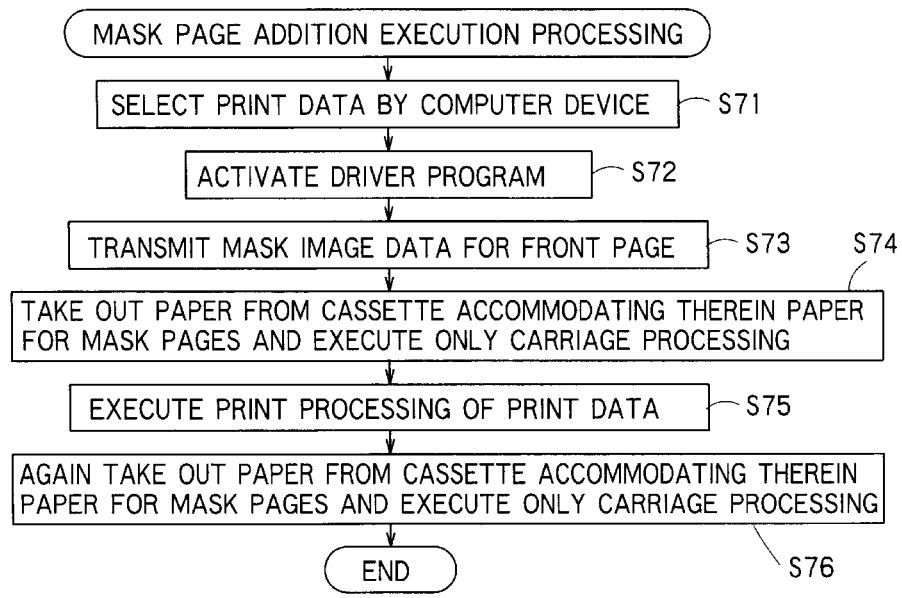
FIG. 13 is a flowchart showing a processing operation of a modification of the mask page addition execution processing.

On the other hand, FIG. 13 is a flowchart showing the processing operation of a modification of the mask page addition execution processing. This flowchart presupposes that a cassette accommodating therein paper sheets for mask pages is attached to the printer.

In the steps S71 and S72 of FIG. 13, the processing similar to the steps S61 and S62 of FIG. 12 is carried out. Subsequently, various print conditions including a direction for adding the mask page and the print data are transmitted from the driver program to the controller 23 of the printer (step S73).

At the time of starting printout, the printer first takes out a paper sheet from the cassette accommodating therein paper sheets for mask pages, and executes only a carriage processing (step S74). The print processing of the print data is sequentially conducted (step S75). The printed paper sheet is sequentially stacked with the printed side being turned down.

Upon completing all the printing operations, the paper sheet is again taken out from the cassette accommodating the paper sheets for mask pages to carry out only the carriage processing (step S76).

Figure 14:
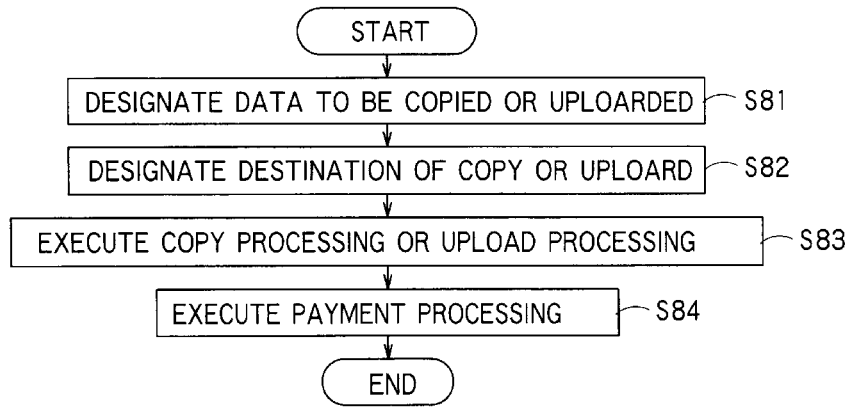
FIG. 14 is a flowchart showing a processing procedure of the information input/output apparatus when a user selects an offer of a data copy or upload service.

FIG. 14 is a flowchart showing the processing procedure of the information input/output apparatus when a user selects the offer of a data copy or upload service. The user himself/herself first goes to the service station 3 designated by the service center 2, or has access to the server of the service station 3 through the user terminal 4 or the like in order to designate data to be copied or uploaded (step S81).

For example, when copying data stored in a predetermined recording medium to another recording medium, the recording medium from which the data is copied is directly handed to the user or a desired recording medium is selected through a menu screen and the like of the computer. When uploading the printed paper document, the image data is temporarily fetched by using a scanning device, and OCR (Optical Character Reader) processing is then executed so that the image data is converted into text data. The thus obtained data is thereafter uploaded to a desired recording medium.

After specifying a destination of copy or upload (step S82), copy processing or upload processing is conducted (step S83). At this time, if the service center 2, the user terminal 4 or others connected to the communication network 1 is selected as a destination of upload, the data is transmitted in the form of an email or packet data to the destination of upload.

In regard to the fee for data copy or upload, payment processing is carried out on the spot when the user directly goes to the service station 3 (step S84). Alternatively, when the user copies or uploads the data through the communication network 1, the account is settled on-line by using a credit card or the like.

FIGS. 15 and 16 are views showing an example where the print processing is performed by using a mobile communication device as the user terminal 4. The user first receives an email transmitted to himself/herself by the mobile communication device (FIG. 15A). If any data that the user wants to print out exists in the received emails, the user transfers that email to the service center 2 (FIG. 15B) and requests that service to the service center 2.

Upon receiving the service request from the mobile communication device, the service center 2 transmits service selection menu information to the mobile communication device. This information is displayed on a display screen of the mobile communication device (FIG. 15C). FIG. 15C shows an example where three services, i.e., "printout", "download" and "upload" are offered and the user selects "printout" and "download."

Upon receiving information of selection by the user, the service center 2 inquires the print condition and a number of print copies (FIG. 15D). FIG. 15D shows an example where the user selects the one-side print and five print color copies in response to this inquiry.

The service center 2 inquires a kind of recording medium to which data is downloaded and an extraction condition of the service station 3 (FIG. 16A). FIG. 16A shows an example where the user selects a floppy disk and automatic extraction by the service station 3 in response to this inquiry.

The service center 2 then detects a current position of the user and displays candidates for the service station 3 available for the user (FIG. 16B). FIG. 16B shows an example where the user selects the service station 3 in Nishi-Shinjuku.

The service center 2 subsequently displays the service utilization fee and seeks validation from the user (FIG. 16C). When the user agreed, direction information from the current position of the user to the service station 3 is displayed (FIG. 16D).

In this manner, since the offers of various services can be received by arbitrarily selecting the service station 3 having necessary devices or facilities even if the user terminal 4 is not equipped with a printer or any facility for download or upload, it is possible to rapidly and precisely meet the diverse service demands of the user in this embodiment.

Further, in this embodiment, when the data with the strict confidentiality is, for example, printed, the confidentiality can be hence maintained, since the classifying processing such as encryption is carried out.

Moreover, when the mobile communication terminal is used as the user terminal 4, the user can reach the service station 3 without going astray, since the information of direction to the service station 2 selected by the user or the surrounding area map information is displayed on the screen.

Although the above has described the examples where the selection of the services and navigation are performed by using the mobile communication terminal with reference to FIGS. 15 and 16, if the user terminal 4 is a stationary PC, the information of direction to the service station 3 or the information of a map of a surrounding area of the service station 3 is displayed on the PC when the user finally selects the service station 3.

The above-described flowcharts of processing in FIGS. 5, 7 and 14 may be implemented in hardware, software or a combination of hardware and software.

When the processing is implemented in software, a program for executing the processing procedure of FIG. 5 and others may be stored in a recording medium such as a floppy disk or a CD-ROM, and read and executed by the computer. The recording medium is not restricted to a portable medium such as a magnetic disk or an optical disk, but it may be a stationary recording medium such as a hard disk drive or a memory.

In addition, the above-described program may be circulated through a communication line (including the wireless communication) such as the internet. Further, the above-mentioned program may be encrypted, modulated or compressed to be circulated through the wire line such as the internet or the wireless line, or it may be stored in the recording medium to be circulated.

What is claimed is:

1. An information input/output system for transmitting/receiving information through a communication network between at least one user terminal, at least one service station for offering various services, and at least one service center for respectively managing said service station, said service center comprising:
candidate selecting means for selecting candidates for said service station capable of offering a service in compliance with content of a request from said user terminal;
candidate transmitting means for transmitting the selected candidates for said service station to said user terminal;
request transmitting means for transmitting a request of said user terminal to said service station selected by said user terminal from said candidates for said service station; and
positional information transmitting means for transmitting information concerning a position of said service station selected by said user terminal to said user terminal, said user terminal comprising:
service requesting means for requesting a service to said service center;
station selecting means for selecting one from said candidates for said service station transmitted from said service center;
selection result transmitting means for transmitting a type of said selected service station to said service center; and
positional information displaying/outputting means for displaying or outputting said information concerning the position of said service station transmitted from said service center.

2. The information input/output system according to claim 1, wherein said service center further comprises service information storing means for storing therein the contents of services which can be provided by each of said service stations, and said candidate selecting means searches said service information storing means in accordance with the content of a request from said user terminal, and selects said candidates for said service station based on a search result.

3. The information input/output system according to claim 2, wherein said candidate selecting means selects only a predetermined number of said service stations in the order from the strongest candidates.

4. The information input/output system according to claim 1, wherein at least a part of said user terminal is a mobile communication terminal, said service center further has position detecting means for detecting a current position of said mobile communication terminal, and said position information transmitting means transmits, to said mobile communication terminal, direction information from a current position of said mobile communication terminal to a position of said service station selected by said station selecting means.

5. The information input/output system according to claim 1, wherein said user terminal is at least one of a mobile communication terminal and a stationary terminal, and said positional information transmitting means transmits map information of an area surrounding the position of said service station to said user terminal.

6. The information input/output system according to claim 1, wherein said service station executes at least one of a print service, a download service and an upload service with respect to information requested by said user terminal.

7. The information input/output system according to claim 1, wherein said service station comprises filing means for filing a printed matter sandwiched between a front cover and a back cover, which are not transparent so that the inside of the printed matter cannot be seen through, when said printed matter consisting of a plurality of pages is printed in response to a request from said user terminal.

8. The information input/output system according to claim 1, wherein said service station comprises filing means for filing a printed matter, with a front page thereof being turned over and superimposed on a second page, when said printed matter consisting of a plurality of pages is printed in response to a request from said user terminal.

9. The information input/output system according to claim 1, wherein said service station comprises ejecting means for ejecting a printed paper sheet, with a printed side thereof being turned down, when said printed matter is printed in response to a request from said user terminal.

10. The information input/output system according to claim 1, wherein said user terminal further comprises print condition designating means for designating at least one of a manufacturer name or a model number of a printer owned by said service station, distinction between monochrome print and color print, a print speed, a size or a thickness of a print paper, presence/absence of a sort function, presence/absence of a group function, presence/absence of a staple function, and presence/absence of a security function.

11. The information input/output system according to claim 1, wherein said user terminal further comprises recording medium designating means for designating a kind of recording medium for download or upload, when a download or an upload service is requested.

12. The information input/output system according to claim 1, wherein said user terminal and said service center interactively transmit/receive information to/from each other through the internet.

13. The information input/output system according to claim 1, wherein said service center carries out authentication processing of said user terminal upon receiving a service request from said user terminal, and accepts the service request of only said user terminal that is successfully authenticated.

14. The information input/output system according to claim 2, wherein said service center comprises information adding means capable of additionally storing various kinds of information provided from at least one of said user terminal and said service station into said service information storing means.

15. An information input/output method for transmitting/receiving information through a communication network between at least one user terminal, at least one service station for providing various services, and at least one service center for respectively managing said service station, comprising the steps of:

requesting a service from said user terminal to said service center;

selecting candidates for said service station capable of providing a service in accordance with the content of a request from said user terminal;

transmitting the selected candidates for said service station from said service center to said user terminal;

selecting any from said candidates for said service station transmitted from said service center;

transmitting a type of said selected service station to said service center;

transmitting information concerning a position of said service station selected by said user terminal from said service center to said user terminal; and displaying or outputting, to said user terminal, said information concerning a position of said service station transmitted from said service center.

16. The information input/output method according to claim 15, wherein at least a part of said user terminal is a mobile communication terminal;

said method further comprises a step of detecting a current position of said mobile communication terminal; and said information concerning a position of said service station transmitted from said service center to said user terminal is direction information to a position of said service station selected by said station selecting means.

17. The information input/output method according to claim 15, wherein said user terminal is at least one of a mobile communication terminal and a stationary terminal; and said information concerning the position of said service station transmitted from said service center to said user terminal is map information of an area surrounding a position of said service station.

18. A recording medium for recording therein a program for transmitting/receiving information through a communication network between at least one user terminal, at least one service station for providing various services, and at least one service center for managing said service station, comprising the steps of:

requesting a service from said user terminal to said service center;

selecting candidates for said service station capable of providing a service in accordance with the content of the request from said user terminal;

transmitting the selected candidates for said service station from said service center to said user terminal;

selecting any from said candidates for said service station transmitted from said service center;

transmitting a type of said selected service station to said service center;

transmitting information concerning a position of said service station selected by said user terminal from said service center to said user terminal; and displaying or outputting, to said user terminal, said information concerning the position of said service station transmitted from said service center.

19. The recording medium according to claim 18, wherein at least a part of said user terminal is a mobile communication terminal;

said recording medium further comprises a step of detecting a current position of said mobile communication terminal; and said information concerning a position of said service station transmitted from said service center to said user terminal is direction information regarding to the position of said service station selected by said station selecting means.

20. The recording medium according to claim 18, wherein said user terminal is at least one of a mobile communication terminal and a stationary terminal; and said information concerning the position of said service station transmitted from said service center to said user terminal is map information of an area surrounding the position of said service station.

\* \* \* \* \*